(12) United States Patent
Wallace

(10) Patent No.: US 6,498,603 B1
(45) Date of Patent: Dec. 24, 2002

(54) SURFACE WAVE TOUCH SCREEN

(75) Inventor: David W. Wallace, Rosyth (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/378,887

(22) Filed: Aug. 23, 1999

(30) Foreign Application Priority Data

Aug. 29, 1998 (GB) .............................................. 9818827

(51) Int. Cl.[7] .................................................. G09G 5/00
(52) U.S. Cl. ...................... 345/177; 345/173; 178/18.04
(58) Field of Search ................................ 345/177, 173; 318/568.15; 178/18.04

(56) References Cited

U.S. PATENT DOCUMENTS

| | | | | |
|---|---|---|---|---|
| 5,854,450 A | * | 12/1998 | Kent | 178/18.04 |
| 5,969,320 A | * | 10/1999 | Leeper et al. | 235/380 |
| 6,028,410 A | * | 2/2000 | Leavitt et al. | 318/568.15 |
| 6,087,599 A | * | 7/2000 | Knowles | 178/18.04 |
| 6,091,406 A | * | 7/2000 | Kambara et al. | 345/177 |
| 6,208,330 B1 | * | 3/2001 | Hasegawa et al. | 345/173 |
| 6,236,391 B1 | * | 5/2001 | Kent et al. | 345/177 |

FOREIGN PATENT DOCUMENTS

| | | |
|---|---|---|
| GB | 1436688 | 5/1976 |
| WO | 9422069 | 9/1994 |

* cited by examiner

*Primary Examiner*—Steven Saras
*Assistant Examiner*—Uchendu O. Anyaso
(74) *Attorney, Agent, or Firm*—Peter H. Priest

(57) ABSTRACT

A surface wave touch screen) comprising a hydrophobic touch panel capable of propagating surface acoustic waves, wherein a touch on the touch panel causes a perturbation of a surface wave propagating through the region of the touch. Surface wave transducer means are coupled to the touch panel for transmitting and receiving surface acoustic waves on the panel and processing means are capable of determining the position of a touch on the panel. Use of a hydrophobic panel is advantageous in that operation of the touch screen is unaffected by moisture and so can be used in external environments.

20 Claims, 2 Drawing Sheets

SURFACE WAVE TOUCH SCREEN

BACKGROUND OF THE INVENTION

This invention relates to a surface wave touch screen for a cathode ray tube (CRT) display panel or other touch-controlled device which is capable of recognizing touch positions along a predetermined coordinate axis on a touch surface. More particularly, it relates to a surface wave touch screen for use in an external environment.

Systems employing a touch screen as a data input device are widely known. By touching the touch screen at a predetermined position with a finger or other object, data is selected that is indicative of that particular position. Thereupon, the associated data is introduced into the system and processed. A touch screen may be combined with a display for selecting data according to the zones shown on the display, such as virtual buttons. Also, the display may function as a means for providing visual feedback to the user by showing the information pertaining to the data after processing.

On the basis of the mechanism for activating the touch screen, several types of touch screens can be distinguished. Touch screens of choice for self service terminals, such as automated teller machines (ATMs), are so-called surface wave touch screens that locate the absorption of surface acoustic waves propagating in a front panel, the absorption occurring as a result of the contact between the panel and a soft tissue such as the user's finger. These touch screens, which have been on the market since 1980, work exceptionally well, are very stable, have no drift and are very resistant to damage. They are currently the preferred touch screens for heavy use self service terminals in unprotected environments, such as through the wall applications, because they will survive a large amount of abuse and vandalism. They do however have the disadvantage that they are adversely affected by water on the screen. Water is a good absorber of acoustic waves, and hence strongly absorbs the surface waves. Water on the touch screen surface results in a local dead area. Even if the touch screen is inclined or mounted vertically, if exposed to water, droplets can adhere to the screen, rendering it inoperative. Drying the water restores the operation of the screen. For this reason, surface wave touch screens are only suitable for dry or sheltered environments, such as shopping malls, where water on the screen is not a major problem.

SUMMARY OF THE INVENTION

It is an object to provide a surface wave touch screen which operates even if water is applied to the surface, and which is thus suitable for use in external environments.

According to the invention there is provided a surface wave touch screen comprising a touch panel capable of propagating surface acoustic waves wherein a touch on the touch panel causes a perturbation of a surface wave propagating through the region of the touch, transmitter and receiver means coupled to the touch panel for transmitting and receiving surface acoustic waves on the touch panel and control means for determining the position of a touch on the touch panel, characterized in that the touch surface is hydrophobic.

By use of a touch surface which is hydrophobic, any water droplets landing on the surface would immediately be shed off the inclined or vertical face of the screen and allow the touch screen to function normally.

Preferably, the panel of the touch screen comprises glass coated with Ritec "CLEAR-SHIELD".

By the use of "CLEAR-SHIELD", the glass touch screen is rendered hydrophobic and anti-static, and its coefficient of friction is reduced. Hence, the touch screen glass becomes a non-stick, easy clean surface, and water and other contaminants are shed more rapidly.

BRIEF DESCRIPTION OF THE DRAWINGS

The invention will now be described with reference to the accompanying drawing in which.

DETAILED DESCRIPTION

Figure 1:
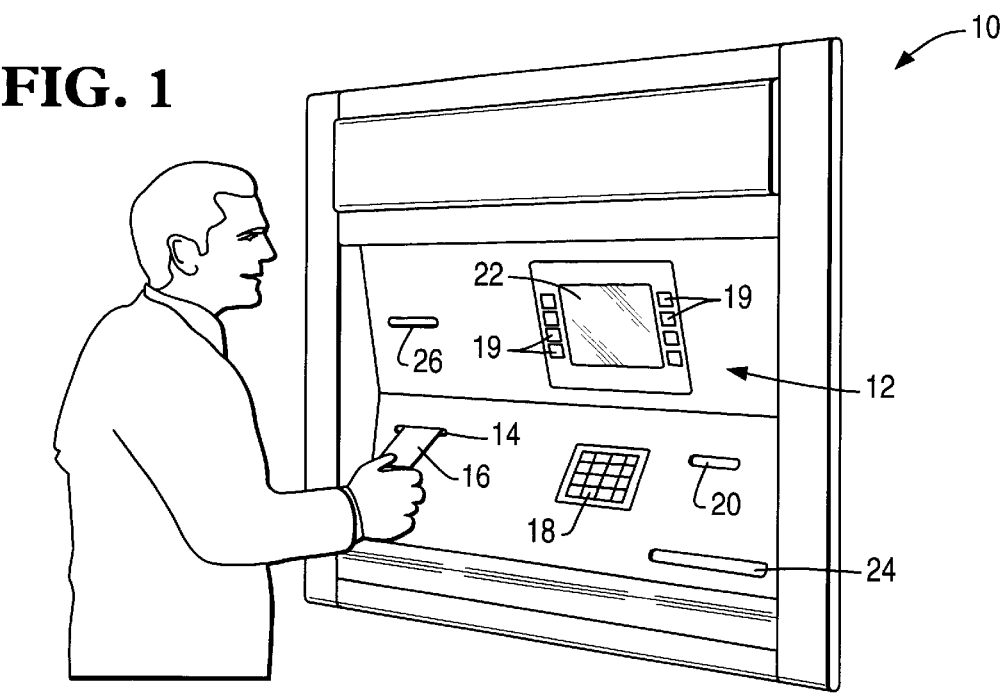
FIG. 1 shows an external perspective view of an automated teller machine (ATM) embodying the present invention.

Referring to FIG. 1, the ATM 10 shown therein comprises a user interface 12 to allow a user to interact with the terminal during a transaction. The user interface 12 includes a card reader slot 14 for insertion of user identification card 16 bearing encoded user data at the commencement of a transaction, a cash dispenser slot 20 for delivery of currency notes stored within the ATM 10 to a customer in a cash withdrawal transaction, a display screen 22 for displaying information to the customer during a transaction, a deposit slot 24 for receiving deposit envelopes containing cash or cheques during a deposit transaction, and a receipt printer slot 26 for delivery of a receipt to a customer at the end of a transaction. The card reader, cash dispenser, depository and receipt printer modules associated with the respective slots 14, 20, 24 and 26 in the user interface 12 of the ATM 10 are designated by the same reference numerals in FIG. 2.

Figure 2:
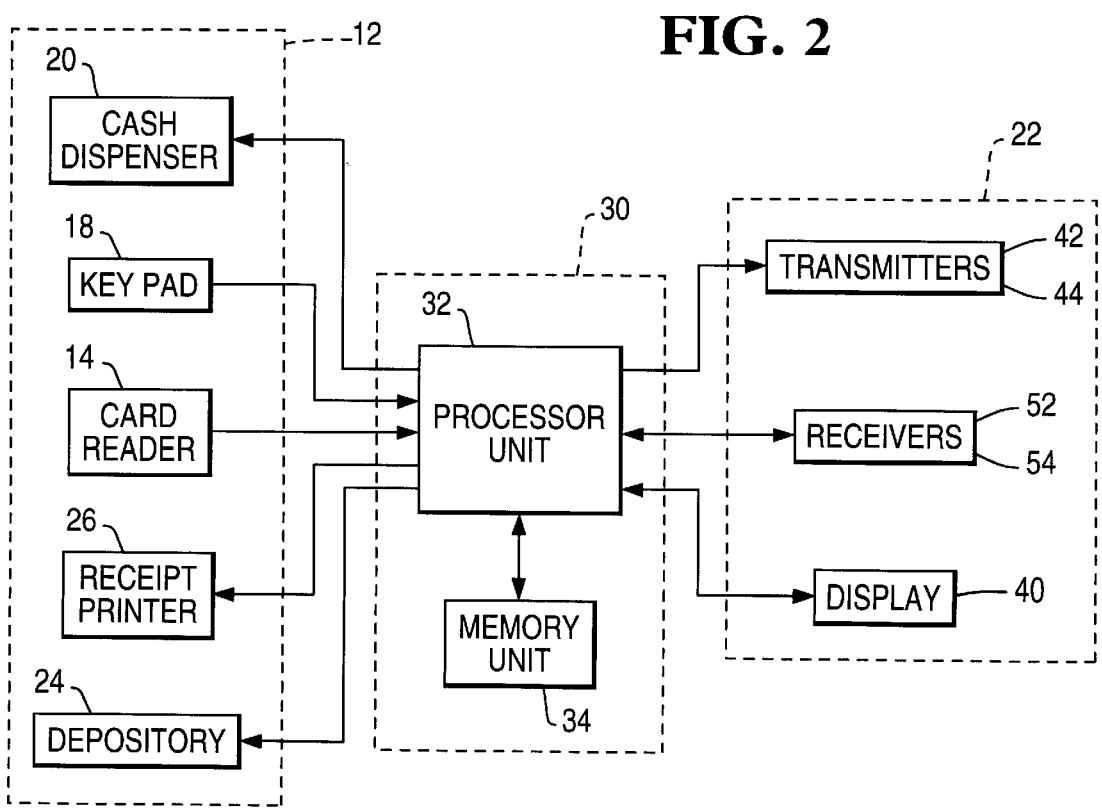
FIG. 2 is a block diagram representation of the ATM of FIG. 1.

With reference to FIG. 2, the ATM 10 further comprises a controller unit 30 which communicates with components of the user interface 12. The controller unit 30 includes a processor unit 32 and a memory unit 34 connected via a bus line to the processor unit 32. The processor unit 32 receives signals from display screen 22 and from various mechanisms of the card reader 14 and the depository 24, and provides output signals to the display 22, the receipt printer 26, the cash dispenser module 20 and to various mechanisms of the card reader module 14. It should be understood that the processor unit 32 controls the amount of cash dispensed by the cash dispenser 20, the information displayed on the display 22 and the information printed by the receipt printer 26. The processor unit 32 may include a microcomputer, and the memory unit 34 may be a non-volatile RAM. The structure and operation of such microcomputer and memory are well known and therefore will not be described.

Figure 3:
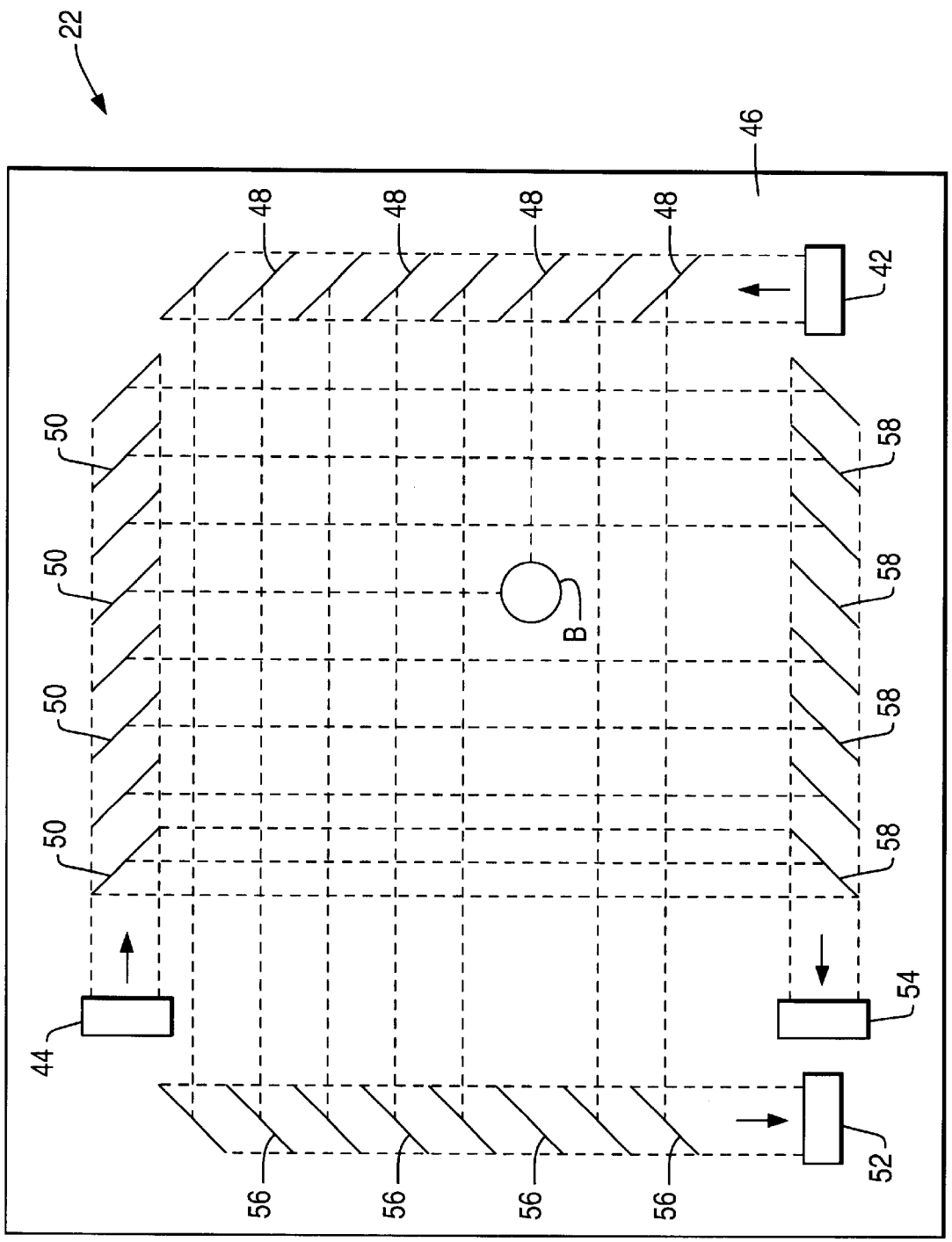
FIG. 3 is a diagrammatic representation of a surface wave touch screen embodying the present invention.

The display screen 22 of the ATM 10 will now be described with reference to FIG. 3. The display screen 22 comprises a surface wave touch screen disposed in front of a flat display, for example of the CRT or LCD type. The surface wave touch screen comprises a transparent panel 46 which is provided with two ultrasonic transmitters 42 and 44 at diametrically opposite corners for transmitting waves to be radiated as surface acoustic waves (SAWs) across the surface thereof and with two series of reflective elements 48 and 50 disposed along two sides of the panel 46 which serve to reflect the SAWs waves across the panel 46. Panel 46 is further provided with two receivers 52 and 54 that receive the waves after they have been reflected by the series of reflective elements 56 and 58 respectively.

The surface wave touch screen 22 operates to cause the waves from transmitters 42 and 44 to be radiated as surface acoustic waves at a high inaudible ultrasonic frequency of around 5.13 MHz. A SAW-pulse transmitted by transmitters 42 or 44 will be received, retarded and broadened by receivers 52 or 54. In order to avoid mutual interference, transmitters 42 and 44 may transmit alternately. When a soft tissue, such as a human finger makes contact at a position B on the panel 46, some of the energy of the SAW-pulse will be absorbed by the tissue, resulting in pulse components of decreased amplitude passing through the location of contact B. Receivers 52 and 54 receive the SAWs after reflection by reflective elements 56 and 58 and are designed to distinguish the reduced pulse components resulting from contact with the panel at point B. The processor unit 32 (FIG. 2) compares the time of receipt of these reduced pulse components by receivers 52 and 54 with the time of transmission from transmitters 42 and 44 respectively and determines the momentary position B at which the absorption of the SAWs occurs.

As the panel 46 is transparent, the display can be viewed through it, for instance in order to provide visual feedback to the user or in order to select data to be processed on the basis of information shown on the display by touching panel 46 at a predetermined position B associated with the data. By determining the momentary position at which the absorption occurs, the processing unit 32 may identify the data associated with position B and process such data as required.

Although panel 46 may be made of other materials which will be known to the skilled person, a particularly suitable material for touch screens is glass (sodium calcium silicate), which has a low coefficient of expansion, while the speed of propagation of acoustic waves remains relatively stable with changes in temperature. This makes the device exceptionally stable with time and temperature. For this reason, glass is the preferred touch screen panel material for ATMs and other self service terminals. However, glass is naturally hydrophilic, so any water droplets landing on its surface are inclined to remain there. This characteristic is particularly disadvantageous for touch screens as they are adversely affected by water, which is a good absorber of acoustic waves. Hence, any water droplets on the surface of the touch screen absorb the surface waves, resulting in local dead areas. Even if the touch screen is inclined or mounted vertically, if exposed to water, droplets tend to adhere to the glass panel, rendering the touch screen inoperative.

Furthermore, glass is a complex inorganic structure having several natural characteristics that make it difficult to keep clean. It does not have a completely smooth surface; microscopic irregularities enable many substances, including lime scale, plaster, mortar, sealants, hydrocarbon pollutants, metal oxides and carbonized food deposits, to stick or bond chemically to the surface such that they cannot be removed by normal cleaning methods.

It has now been found that these problems may be overcome by making the surface of the panel hydrophobic. Preferably, this is achieved by coating the glass panel 46 with a copolymer sold under the trademark "CLEAR-SHIELD", which modifies the glass surface rendering it hydrophobic and anti-static. "CLEAR-SHIELD" chemically cross-links with itself and the glass, forming a completely transparent multi-molecular layer which is non-hazardous, thermally stable, chemically inert to most substances as soon as it is cured, and which will not crack, peel or flake. "CLEAR-SHIELD" also reduces the coefficient of friction of the glass to 60–70% that of untreated glass. Modifying the surface of the glass in this way prevents moisture from sitting on the touch screen 40, so allowing it to function normally in wet conditions. "CLEAR-SHIELD" is commercially available from Ritec International Ltd., 15 Royal London Estate, West Road, London N17 0XL, UK.

Although coating the glass panel with "CLEAR-SHIELD" offers distinct advantages as discussed above, it is to be understood that the present invention is not limited to the use of "CLEAR-SHIELD"; any material which renders the surface of a touch screen hydrophobic to prevent moisture from sitting on the inclined or vertical screen may be used. For example, this may be achieved by coating the glass panel with a silicone fluid-based water repellent.

When a touch screen modified in this way is used in an ATM or other self-service terminal, any water, including rain drops and cleaning water, which might fall on the screen is immediately repelled from the inclined or vertical surface of the screen leaving it dry and operational. In this way, the touch screen according to the invention enables self service terminals to be installed in unsheltered external environments, unaffected by rain or other ambient moisture. In particular, self-service terminals already installed in such locations may now be fitted with the preferred glass touch screen according to the invention. Furthermore, if the touch screen is provided with a non-stick anti-static surface, it will enable the screen to keep clean for longer, and will also allow it to be easily cleaned with water, whilst leaving the terminal immediately useable after cleaning.

It will be understood that the present disclosure is for the purpose of illustration only, and the invention extends to modifications, variations and improvements thereto.

What is claimed is:

1. A surface wave touch screen comprising:
   a hydrophobic panel capable of propagating surface acoustic waves wherein a touch on the panel causes a perturbation of a surface wave propagating through the region of the touch, the hydrophobic panel allowing viewing of displayed images;
   transmitter and receiver means coupled to the panel for transmitting and receiving surface acoustic waves on the panel; and
   control means for determining the location of a touch on the panel, the controller detecting a user selection of a function associated with a displayed image upon detection of a touch of the panel in a location associated with the image.

2. A surface wave touch screen according to claim 1, wherein the panel comprises surface-treated glass.

3. A surface wave touch screen according to claim 2, wherein the surface-treated glass has a coefficient of friction of 70% or less than that of untreated glass.

4. A surface wave touch screen according to claim 2, wherein the surface-treated glass is anti-static.

5. A surface wave touch screen according to claim 3, wherein the surface-treated glass is anti-static.

6. A surface wave touch screen according to claim 2, wherein the surface-treated glass comprises glass coated with a silicone fluid-based water repellent.

7. A surface wave touch screen according to claim 3, wherein the surface-treated glass comprises glass coated with a silicone fluid-based water repellent.

8. A surface wave touch screen according to claim 4, wherein the surface-treated glass comprises glass coated with a silicone fluid-based water repellent.

9. A surface wave touch screen according to claim 3, wherein the surface-treated glass comprises glass coated with "CLEAR-SHIELD".

10. A surface wave touch screen according to claim 4, wherein the surface-treated glass comprises glass coated with "CLEAR-SHIELD".

11. An automated teller machine (ATM) comprising:
   a display;
   a hydrophobic panel through which the display can be viewed, the hydrophobic panel being capable of propagating surface acoustic waves wherein a touch on the panel causes a perturbation of a surface wave propagating through the region of the touch;
   a transmitter coupled to the panel for transmitting surface acoustic waves on the panel;
   a receiver coupled to the panel for receiving surface acoustic waves on the panel; and
   a controller for determining the location of a touch on the panel, the controller noting a user selection of a function associated with a displayed image upon detection of a touch of the panel in a location associated with the image.

12. An ATM according to claim 11, wherein the panel comprises surface-treated glass.

13. An ATM according to claim 12, wherein the surface-treated glass has a coefficient of friction of 70% or less than that of untreated glass.

14. An ATM according to claim 12, wherein the surface-treated glass is antistatic.

15. An ATM according to claim 13, wherein the surface-treated glass is antistatic.

16. An ATM according to claim 12, wherein the surface-treated glass comprises glass coated with a silicone fluid-based water repellent.

17. An ATM according to claim 13, wherein the surface-treated glass comprises glass coated with a silicone fluid-based water repellent.

18. An ATM according to claim 14, wherein the surface-treated glass comprises glass coated with a silicone fluid-based water repellent.

19. An ATM according to claim 13, wherein the surface-treated glass comprises glass coated with "CLEAR-SHIELD".

20. An ATM according to claim 14, wherein the surface-treated glass comprises glass coated with "CLEAR-SHIELD".

* * * * *